(12) United States Patent
Hirano

(10) Patent No.: US 11,477,047 B2
(45) Date of Patent: Oct. 18, 2022

(54) IN-VEHICLE NETWORK SYSTEM

(71) Applicant: TOYOTA JIDOSHA KABUSHIKI KAISHA, Toyota (JP)

(72) Inventor: Takahiro Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 16/860,416

(22) Filed: Apr. 28, 2020

(65) Prior Publication Data
US 2021/0014082 A1  Jan. 14, 2021

(30) Foreign Application Priority Data
Jul. 9, 2019  (JP) .............................. JP2019-127627

(51) Int. Cl.
*G07C 5/08* (2006.01)
*B60R 16/03* (2006.01)
*B60R 16/023* (2006.01)
*H04L 12/40* (2006.01)
*H04L 12/10* (2006.01)

(52) U.S. Cl.
CPC .... *H04L 12/40182* (2013.01); *B60R 16/0232* (2013.01); *B60R 16/03* (2013.01); *G07C 5/0808* (2013.01); *H04L 12/10* (2013.01); *H04L 12/40* (2013.01); *H04L 2012/40273* (2013.01)

(58) Field of Classification Search
CPC ..... B60R 16/0232; B60R 16/03; H04L 12/40; H04L 12/40182; G07C 5/0808
USPC ....................................................... 307/10.1
See application file for complete search history.

(56) References Cited

U.S. PATENT DOCUMENTS

| | | | | |
|---|---|---|---|---|
| 9,604,585 | B2* | 3/2017 | Joyce | G05D 1/0077 |
| 2006/0015231 | A1* | 1/2006 | Yoshimura | B60L 3/0076 |
| | | | | 701/1 |
| 2010/0088004 | A1* | 4/2010 | Maki | H02G 3/086 |
| | | | | 307/9.1 |
| 2010/0268980 | A1* | 10/2010 | Watanabe | H04L 12/40136 |
| | | | | 714/48 |
| 2015/0112510 | A1* | 4/2015 | Tokunaga | G06F 1/3206 |
| | | | | 701/1 |
| 2019/0275891 | A1* | 9/2019 | Shi | B60L 3/12 |
| 2021/0009054 | A1* | 1/2021 | Hirano | B60R 16/0231 |

FOREIGN PATENT DOCUMENTS

JP  2011-040912 A  2/2011

* cited by examiner

Primary Examiner — Michael R. Fin
(74) Attorney, Agent, or Firm — Oliff PLC

(57) ABSTRACT

An in-vehicle network system includes a power source, an upper electronic control unit (ECU), a first intermediate ECU and a second intermediate ECU, at least one first lower ECU and at least one second lower ECU, a power source relay, and a communication relay provided between the first communication path and the second communication path. When the upper ECU detects that an anomaly occurs in the first intermediate ECU, the power source relay and the communication relay are controlled such that a first power source path and a second power source path are connected to each other and a first communication path and a second communication path are connected to each other, and the second intermediate ECU performs electric power supply to and communication management of the first lower ECU.

6 Claims, 3 Drawing Sheets

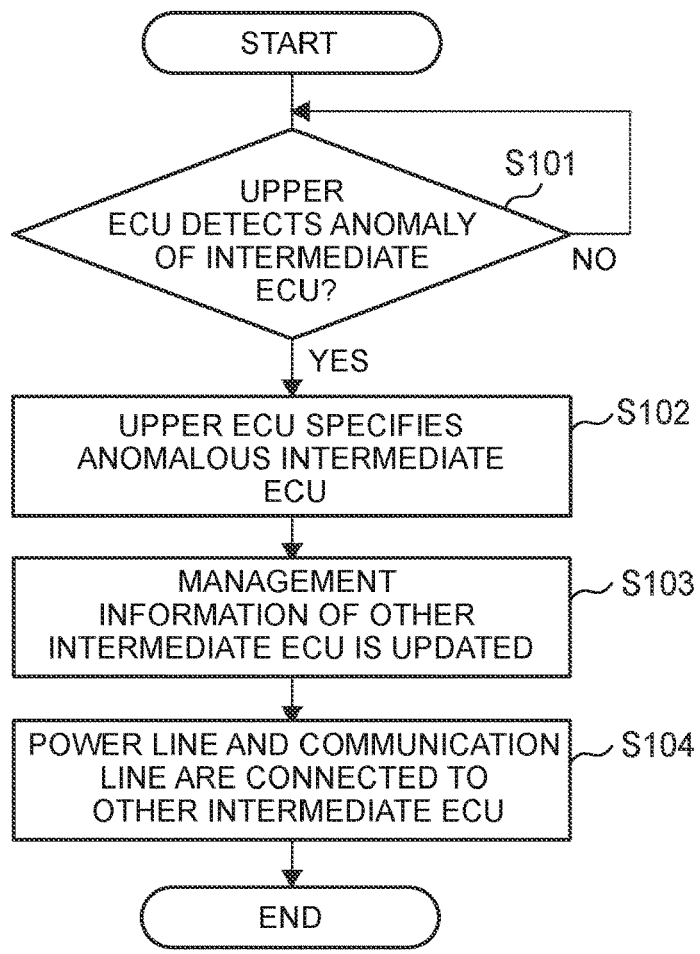
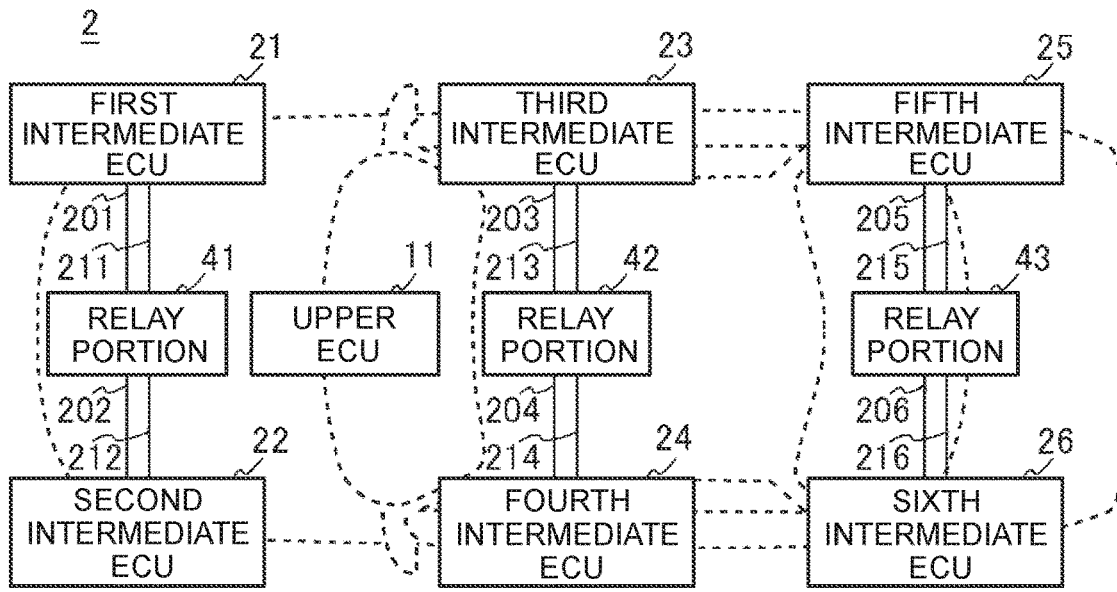

IN-VEHICLE NETWORK SYSTEM

INCORPORATION BY REFERENCE

The disclosure of Japanese Patent Application No. 2019-127627 filed on Jul. 9, 2019 including the specification, drawings and abstract is incorporated here by reference in its entirety.

BACKGROUND

1. Technical Field

The disclosure relates to an in-vehicle network system.

2. Description of Related Art

A vehicle is equipped with a plurality of on-board devices each called an electronic control unit (ECU). The ECUs are connected to each other via communication lines to configure a network system. Japanese Unexamined Patent Application Publication No. 2011-40912 (JP 2011-40912 A) discloses a form of a network system in which a plurality of ECUs, each of which is called a manager, are connected to each other to configure an upper-layer network, and each of the manager ECUs is connected to its subordinate ECUs to configure a lower-layer network for each manager ECU.

SUMMARY

In a network system as disclosed in JP 2011-40912 A, when the manager ECU malfunctions and a relay function to relay communication messages, etc., by the manager ECU is suspended, functions become unable to work even when subordinate ECUs are working normally.

The disclosure provides a highly robust in-vehicle network system.

An in-vehicle network system according to a first aspect of the disclosure includes: a power source; an upper electronic control unit; a first intermediate electronic control unit and a second intermediate electronic control unit, each of the first intermediate electronic control unit and the second intermediate electronic control unit being configured to receive electric power supply from the power source and perform communication with the upper electronic control unit; at least one first lower electronic control unit that is connected to the first intermediate electronic control unit via a first power source path and a first communication path, electric power supply to the first lower electronic control unit and communication management of the first lower electronic control unit being performed by the first intermediate electronic control unit; at least one second lower electronic control unit that is connected to the second intermediate electronic control unit via a second power source path and a second communication path, electric power supply to the second lower electronic control unit and communication management of the second lower electronic control unit being performed by the second intermediate electronic control unit; a power source relay provided between the first power source path and the second power source path; and a communication relay provided between the first communication path and the second communication path, wherein when the upper electronic control unit detects that an anomaly occurs in the first intermediate electronic control unit, the power source relay and the communication relay are controlled such that the first power source path and the second power source path are connected to each other and the first communication path and the second communication path are connected to each other, and the electric power supply to the first lower electronic control unit and the communication management of the first lower electronic control unit are performed by the second intermediate electronic control unit.

In the above aspect, when the upper electronic control unit detects that an anomaly occurs in the second intermediate electronic control unit, the power source relay and the communication relay may be controlled such that the first power source path and the second power source path are connected to each other and the first communication path and the second communication path are connected to each other, and the electric power supply to the second lower electronic control unit and the communication management of the second lower electronic control unit may be performed by the first intermediate electronic control unit.

In the above aspect, the upper electronic control unit may be configured to, when the second intermediate electronic control unit performs the communication management of the first lower electronic control unit, update information stored in the second intermediate electronic control unit.

In the above aspect, the second intermediate electronic control unit may be configured to, when the second intermediate electronic control unit performs the communication management of the first lower electronic control unit, update information to be used for performing the communication management, and the first intermediate electronic control unit may be configured to, when the first intermediate electronic control unit performs the communication management of the second lower electronic control unit, update information to be used for performing the communication management.

An in-vehicle network system according to a second aspect of the disclosure includes: a power source; an upper electronic control unit; a plurality of intermediate electronic control units configured to receive electric power supply from the power source and perform communication with the upper electronic control unit; a plurality of lower electronic control units that are connected to any one of the intermediate electronic control units via a power source path and a communication path, electric power supply to each of the lower electronic control units and communication management of each of the lower electronic control units are performed by the intermediate electronic control unit to which each of the lower electronic control units is connected; a power source relay provided between the power source path of each of the intermediate electronic control units and the power source path of each of other two or more of the intermediate electronic control units; and a communication relay provided between the communication path of each of the intermediate electronic control units and the communication path of each of other two or more of the intermediate electronic control units, wherein: when the upper electronic control unit detects that an anomaly occurs in any one of the intermediate electronic control units, the power source relay and the communication relay are controlled such that connection between the power source paths and connection between the communication paths of the intermediate electronic control unit in which the anomaly occurs and a selected intermediate electronic control unit that is selected from the other two or more intermediate electronic control units are established, and the electric power supply to and the communication management of the lower electronic control unit connected to the intermediate electronic control unit in which the anomaly occurs are performed by the selected intermediate electronic control unit.

In the above aspect, the selected intermediate electronic control unit may be the intermediate electronic control unit having a smallest communication load of the communication path among the other two or more intermediate electronic control units.

According to the disclosure, when an anomaly occurs in the ECU, another ECU substitutes for the anomalous ECU and performs power supply to and communication management of the subordinate ECUs of the anomalous ECU. Consequently, the disclosure can provide a highly robust in-vehicle network system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart that illustrates processing when an anomaly occurs in the network system according to the embodiment of the disclosure;

FIG. 3 is a configuration diagram of a network system according to a first modification of the disclosure.

DETAILED DESCRIPTION OF EMBODIMENTS

In a network system according to the disclosure, when an anomaly occurs with an electronic control unit (ECU), subordinate ECUs of the anomalous ECU are connected to another ECU by a relay, and the other ECU performs power supply to and communication management of the anomalous ECU. This makes it possible to allow the functions of the subordinate ECUs to continuously work even when an anomaly occurs with the ECU. Accordingly, robustness of the network system can further be enhanced.

Embodiment

Hereinafter, an embodiment of the disclosure will be described in detail with reference to the drawings.

Configuration

Figure 1:
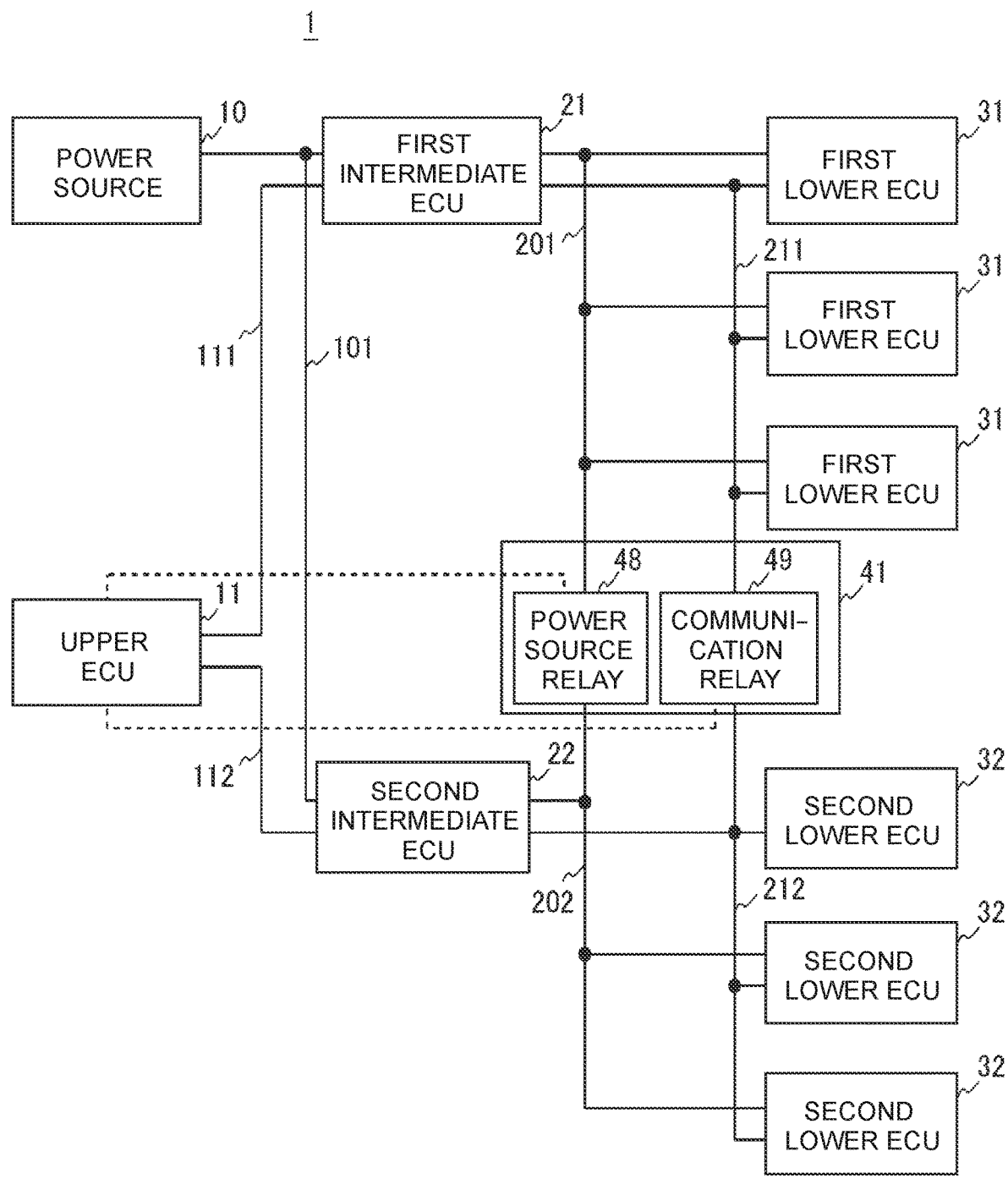
FIG. 1 is a configuration diagram of a network system according to an embodiment of the disclosure.

FIG. 1 shows a configuration diagram of a network system 1 according to the embodiment.

The network system 1 includes a tree-type connection topology. FIG. 1 shows a configuration in which two intermediate nodes are arranged under one upper node, and three lower nodes are arranged under each of the intermediate nodes. In FIG. 1, an upper ECU 11 is as the upper node. A first intermediate ECU 21 and a second intermediate ECU 22 are the intermediate nodes. A first lower ECU 31 is the lower node arranged under the first intermediate ECU 21, and a second lower ECU 32 is the lower node under the second intermediate ECU 22. The network system 1 is mounted on a vehicle and includes the ECUs above and a power source 10 that supplies electric power to the ECUs. In the following description, as the intermediate nodes, two ECUs, namely, the first intermediate ECU 21 and the second intermediate ECU 22, are provided. However, the number of the intermediate nodes and the number of the subordinate lower nodes of each of the intermediate nodes are not specifically limited.

As an example, the upper ECU 11 is a relatively highly functional ECU that collectively performs computations for various vehicle control functions.

For example, the lower ECUs such as the first lower ECU 31 and the second lower ECU 32 are the ECUs that are provided in respective portions of the vehicle and include a function that is relatively specialized in individual control of each sensor or each actuator.

The intermediate ECUs such as the first intermediate ECU 21 and the second intermediate ECU 22 are the ECUs that function as a gateway to relay communication between the upper ECU 11 and the lower ECUs. The first intermediate ECU 21 performs communication management, including relay of communication between the upper ECU 11 and the first lower ECU 31 and management of communication between a plurality of the first lower ECUs 31, based on first management information (routing map). The first intermediate ECU 21 may store the first management information in advance as management information for the first intermediate ECU 21, and may receive the first management information from the upper ECU 11 and store the information when the first intermediate ECU 21 is activated. Similarly, the second intermediate ECU 22 performs communication management, including relay of communication between the upper ECU 11 and the second lower ECU 32 and management of communication between a plurality of the second lower ECUs 32, based on second management information (routing map). The second intermediate ECU 22 may store the second management information in advance as management information for the second intermediate ECU 22, or may receive the second management information from the upper ECU 11 and store the information when the second intermediate ECU 22 is activated.

Each of the above ECUs is typically configured to include a control portion, such as a processor or a microcomputer, and a memory.

The upper ECU 11 and the first intermediate ECU 21 are connected by a communication line 111. The first intermediate ECU 21 and the first lower ECUs 31 are connected by a communication line (bus) (first communication path) 211. The upper ECU 11 and the second intermediate ECU 22 are connected by a communication line 112. The second intermediate ECU 22 and the second lower ECUs 32 are connected by a communication line (bus) (second communication path) 212. Communication between the upper ECU 11 and the first intermediate ECU 21 and communication between the upper ECU 11 and the second intermediate ECU 22 are performed in accordance with, for example, the Ethernet (registered trademark) standard. However, the communication standard is not limited thereto. Communication between the first intermediate ECU 21 and the first lower ECUs 31 and communication between the second intermediate ECU 22 and the second lower ECUs 32 are performed in accordance with, for example, the controller area network (CAN; registered trademark) standard. However, the communication standard is not limited thereto.

The power source 10 is connected to the first intermediate ECU 21 and the second intermediate ECU 22 by a power line 101. The first intermediate ECU 21 and the first lower ECUs 31 are connected by a power line (first power source path) 201. The second intermediate ECU 22 and the second lower ECUs 32 are connected by a power line (second power source path) 202. The first intermediate ECU 21 and the second intermediate ECU 22 each include a relay (not illustrated), for example. The power line 101 and the power line 201 are connected to each other via the relay of the first intermediate ECU 21. The power line 101 and the power line 202 are connected to each other via the relay of the second intermediate ECU 22. With this configuration, electric power supplied from the power source 10 is supplied to the first lower ECUs 31 and the second lower ECUs 32 via the first intermediate ECU 21 and the second intermediate ECU 22, respectively. The first intermediate ECU 21 and the second intermediate ECU 22 can supply electric power to the first lower ECUs 31 and the second lower ECUs 32 by controlling the respective relays. Although not illustrated, the power source 10 and the upper ECU 11 may be connected to each other by the power line 101, or may be connected to each other by another power line provided separately from the power lines described above.

The upper ECU 11 collects, for example, information on the vehicle and surrounding conditions of the vehicle from the first lower ECUs 31 and the second lower ECUs 32 that control the sensors. This information may include, for example, operational conditions of the actuators, etc., driving conditions of the vehicle such as vehicle speed and acceleration, environmental conditions of the vehicle such as roads and traffic signs surrounding the vehicle, a seating status of an occupant, and details of operations performed with respect to each portion of the vehicle. The upper ECU 11 performs a computation based on this information and generates control data. The control data is data for controlling various functions of the vehicle, such as an autonomous driving function, a self-parking function, and drive assistance functions including collision avoidance, lane keeping, following of a preceding vehicle, and maintaining speed, and operational control on an engine, a transmission, a cooling device, and an air conditioner, charging and discharging control of a battery, lighting of headlamps in accordance with illuminance, permission of unlocking doors based on authentication using a mobile device (electronic key), and presentation of information to a user. The upper ECU 11 transmits the control data as necessary to the first lower ECUs 31 and the second lower ECUs 32 that control the actuators to cause the actuators to operate in accordance with the control data. In the network system 1, cost is reduced by concentrating various control functions of the vehicle in the upper ECU 11 and relatively simplifying the configurations of the plurality of first lower ECUs 31 and the second lower ECUs 32 instead.

The network system 1 includes a relay portion 41. The relay portion 41 is provided between the first intermediate ECU 21 and the second intermediate ECU 22, and includes a power source relay 48 and a communication relay 49. The power source relay 48 can switch between a state where the power line 201 is not connected to the power line 202 and a state where the power line 201 is connected to the power line 202. The communication relay 49 can switch between a state where the communication line 211 is not connected to the communication line 212 and a state where the communication line 211 is connected to the communication line 212. In the illustrated example, the relay portion 41 is controlled by the upper ECU 11.

Processing

Processing to be performed when an anomaly occurs in the network system 1 according to the embodiment will be described below. FIG. 2 is a flowchart illustrating the processing when an anomaly occurs. The processing when an anomaly occurs in the first intermediate ECU 21 will be described herein as an example with reference to FIG. 2. At the timing of starting this processing, there is no anomaly occurring, and the network system 1 normally operates. In this state, the power source relay 48 and the communication relay 49 in the relay portion 41 are both open.

In step S101, when an anomaly has occurred in any of the intermediate ECUs, the upper ECU 11 can detect such occurrence of the anomaly. When the upper ECU 11 detects that an anomaly has occurred in any of the intermediate ECUs, the process proceeds to step S102. When the upper ECU 11 does not detect occurrence of an anomaly, the upper ECU 11 repeats the process in step S101. The upper ECU 11 can detect occurrence of an anomaly based on, for example, disruption of communication from the intermediate ECU and receipt of a message from the intermediate ECU notifying an anomaly.

In step S102, the upper ECU 11 specifies the corresponding intermediate ECU in which an anomaly has occurred based on the details of the detected anomaly. As one example, the upper ECU 11 herein specifies the first intermediate ECU 21 as the intermediate ECU in which an anomaly has occurred.

In step S103, the upper ECU 11 updates the management information of the second intermediate ECU 22. As one example, the upper ECU 11 previously stores the management information to be used by each intermediate ECU. The upper ECU 11 herein transmits the first management information for the first intermediate ECU 21 to the second intermediate ECU 22. The second intermediate ECU 22 sets, based on the received first management information and the second management information stored in the second intermediate ECU 22, management information containing the contents of the received first management information and the stored second management information as new management information to be used. Alternatively, as another example, the upper ECU 11 may transmit to the second intermediate ECU 22 a command to include the first management information in new management information. In this case, the second intermediate ECU 22 stores the management information to be used by each intermediate ECU in advance, and adds the contents of the first management information to the second management information that is currently in use based on the command received from the upper ECU 11 to set new management information.

In step S104, the upper ECU 11 causes the power source relay 48 of the relay portion 41 to close and connect the power line 201 and the power line 202, and causes the communication relay 49 to close and connect the communication line 211 and the communication line 212. Each intermediate ECU, instead of the upper ECU 11, may perform control of the relay portion 41. In this case, the upper ECU 11 transmits to the second intermediate ECU 22 that is operating normally a command to control the power source relay 48 and the communication relay 49 of the relay portion 41 to close, and the second intermediate ECU 22 that receives the command performs the control.

With the processing above, when an anomaly occurs in the first intermediate ECU 21, the first lower ECUs 31 under the first intermediate ECU 21 are connected to the second intermediate ECU 22, and at the same time, the second intermediate ECU 22 updates the management information to be used by the second intermediate ECU 22. This allows the second intermediate ECU 22 to perform communication relay between the upper ECU 11 and the first lower ECUs 31 and communication management among the first lower ECUs 31, instead of the first intermediate ECU 21. The second intermediate ECU 22 also continues communication relay between the second lower ECUs 32 and the upper ECU 11 and communication management among the second lower ECUs 32.

In the above example, the case where an anomaly occurs in the first intermediate ECU 21 is described. Even when an anomaly occurs in the second intermediate ECU 22, the first intermediate ECU 21 can perform, as a substitute for the second intermediate ECU 22, communication relay between the upper ECU 11 and the second lower ECUs 32 and communication management among the second lower ECUs 32 by performing the same or similar processing. As described above, when an anomaly occurs in one of the intermediate ECUs of the same group, the other of the intermediate ECUs can perform communication management on the lower ECUs under both of the intermediate ECUs.

First Modification

The network system 2 includes six intermediate ECUs. Subordinate lower ECUs are connected to each intermediate ECU. However, illustration of these lower ECUs is herein omitted. The power line and the communication line that connect the power source or the upper ECU 11 and each intermediate ECU are also omitted in the drawing. As shown in FIG. 3, as an example, each intermediate ECU is arranged separately in each portion of the vehicle. FIG. 3 shows a configuration diagram of a network system 2 according to a first modification.

In the network system 2, the power line 201 and the power line 202 are connected to each other via the relay portion 41. The power line 201 connects the first intermediate ECU 21 and its subordinate lower ECUs, and the power line 202 connects the second intermediate ECU 22 and its subordinate lower ECUs. The communication line 211 and the communication line 212 are connected to each other via the relay portion 41. The communication line 211 connects the first intermediate ECU 21 and its subordinate lower ECUs, and the communication line 212 connects the second intermediate ECU 22 and its subordinate lower ECUs.

A power line 203 is connected to a power line 204 via a relay portion 42. The power line 203 connects a third intermediate ECU 23 and its subordinate lower ECUs, and the power line 204 connects a fourth intermediate ECU 24 and its subordinate lower ECUs. A communication line 213 and a communication line 214 are connected to each other via the relay portion 42. The communication line 213 connects the third intermediate ECU 23 and its subordinate lower ECUs, and the communication line 214 connects the fourth intermediate ECU 24 and its subordinate lower ECUs. The relay portion 42 may have a power source relay connecting the power lines 203 and 204 and a communication relay connecting the communication lines 213 and 214.

A power line 205 and a power line 206 are connected to each other via a relay portion 43. The power line 205 connects a fifth intermediate ECU 25 and its subordinate lower ECUs, and the power line 206 connects a sixth intermediate ECU 26 and its subordinate lower ECUs. A communication line 215 and a communication line 216 are connected to each other via the relay portion 43. The communication line 215 connects the fifth intermediate ECU 25 and its subordinate lower ECUs, and the communication line 216 connects the sixth intermediate ECU 26 and its subordinate lower ECUs. The relay portion 43 may have a power source relay connecting the power lines 205 and 206 and a communication relay connecting the communication lines 215 and 216.

In the network system 2, a similar processing to the processing described in the above embodiment is performed on a group of the first intermediate ECU 21 and the second intermediate ECU 22, a group of the third intermediate ECU 23 and the fourth intermediate ECU 24, and a group of the fifth intermediate ECU 25 and the sixth intermediate ECU 26. When an anomaly occurs in one of the intermediate ECUs in each of the groups, the other of the intermediate ECU in the same group can perform communication management of the subordinate lower ECUs in the corresponding group.

Second Modification

Figure 4:
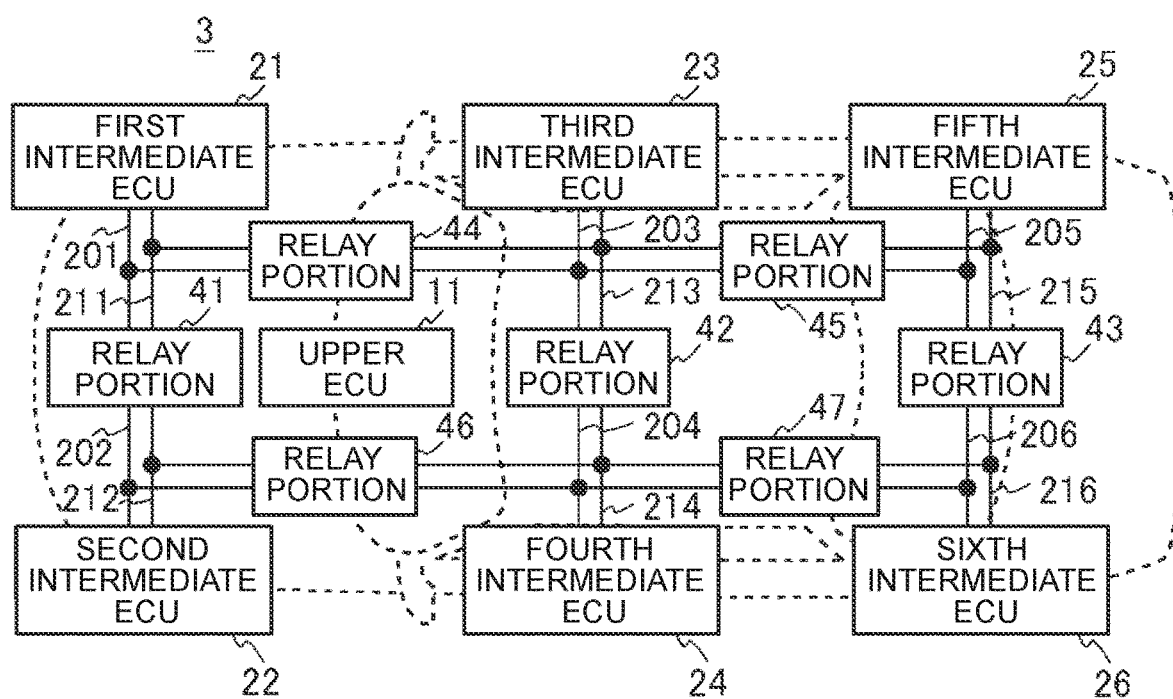
FIG. 4 is a configuration diagram of a network system according to a second modification of the disclosure.

FIG. 4 shows a configuration diagram of a network system 3 according to a second modification. In the network system 3, more relay portions are added to the network system 2.

In the network system 3, the power line 201 and the power line 203 are connected via a relay portion 44. The communication line 211 and the communication line 213 are connected to each other via the relay portion 44.

The power line 203 and the power line 205 are connected to each other via the relay portion 45. The communication line 213 and the communication line 215 are connected to each other via the relay portion 45.

The power line 202 and the power line 204 are connected to each other via a relay portion 46. The communication line 212 and the communication line 214 are connected via the relay portion 46.

The power line 204 and the power line 206 are connected to each other via a relay portion 47. The communication line 214 and the communication line 216 are connected via the relay portion 47.

As described above, in the network system 3, each intermediate ECU is provided with the relay portions between itself and other intermediate ECUs, respectively. In this modification, the processing when an anomaly occurs in the intermediate ECU is changed from the processing in the embodiment above as described below. The changes in this modification from the embodiment above will be described below.

In the embodiment above, when an anomaly occurs in one of the intermediate ECUs of the same group, the other ECU that is uniquely determined substitutes for the anomalous ECU. In this modification, any one of the other intermediate ECUs that is selected substitutes for the anomalous ECU.

Therefore, in step S103, the upper ECU 11 selects, for example, the intermediate ECU having a smaller communication load among the other normal intermediate ECUs each having the relay portion between itself and the anomalous ECU. The communication load can be derived based on, for example, a bus load for a latest prescribed period. The bus load is obtained by the upper ECU 11 by constantly monitoring the load of the communication line (bus) between each intermediate ECU and its subordinate lower ECUs. However, the method of selection of the substitute ECU is not limited to this. In step S103, the upper ECU 11 updates the management information of the selected intermediate ECU. In step S104, the upper ECU 11 controls the relay portion provided between the anomalous intermediate ECU and the selected intermediate ECU to establish connection between the power lines and between the communication lines. For example, when an anomaly occurs in the first intermediate ECU 21, the second intermediate ECU 22 having the relay portion 41 between itself and the first intermediate ECU 21 and the third intermediate ECU 23 having the relay portion 44 between itself and the first intermediate ECU 21 are the candidate ECUs for selection. For example, when the communication load of the third intermediate ECU 23 is smaller than the communication load of the second intermediate ECU 22, the third intermediate ECU 23 is selected and the relay portion 44 is caused to establish connection between the power lines and establish connection between the communication lines of the first intermediate ECU 21 and the third intermediate ECU 23. The third intermediate ECU 23 performs communication management of the lower ECUs under the first intermediate ECU 21 in addition to the lower ECUs under the third intermediate ECU 23.

In this modification, each intermediate ECU may be provided with the relay portions between itself and three or more intermediate ECUs. In this case, in step S103, when an anomaly occurs in each intermediate ECU, the intermediate ECU having the smallest communication load among the three or more intermediate ECUs may be selected.

Effects

In the network systems 1, 2, and 3 according to the embodiment and the modifications, when an anomaly occurs in an intermediate ECU, its subordinate lower ECUs are connected to another intermediate ECU using the relay and the other intermediate ECU substitutes for the anomalous ECU and performs power supply to and communication management of the lower ECUs. With this configuration, even when an anomaly occurs in the intermediate ECU, the functions of the lower ECUs can continue to work. This makes it possible to enhance the robustness of the network system Further, as in the network system 3 according to the second modification, one of the plurality of intermediate ECUs having the smallest communication load performs communication management of the lower ECUs under the anomalous ECU. With this configuration, compared to the embodiment and the first modification, a possibility to exceed the allowable load range can be reduced even when the communication load increases, thereby further enhancing the robustness of the network system.

The disclosure is not limited to the network system, and can be embodied as a method of controlling the network system, a control program for the network system to be performed by the ECU having the processor and the memory and a computer-readable non-transitory storage medium that stores the control program, and a vehicle equipped with the network system, etc. In addition, the disclosure can apply to network systems other than the network system mounted on the vehicle.

The disclosure is advantageous for a network system mounted on a vehicle, etc.

What is claimed is:

1. An in-vehicle network system, comprising:
a power source;
an upper electronic control unit;
a first intermediate electronic control unit and a second intermediate electronic control unit, each of the first intermediate electronic control unit and the second intermediate electronic control unit being configured to receive electric power supply from the power source and perform communication with the upper electronic control unit;
at least one first lower electronic control unit that is connected to the first intermediate electronic control unit via a first power source path and a first communication path, electric power supply to the first lower electronic control unit and communication management of the first lower electronic control unit being performed by the first intermediate electronic control unit;
at least one second lower electronic control unit that is connected to the second intermediate electronic control unit via a second power source path and a second communication path, electric power supply to the second lower electronic control unit and communication management of the second lower electronic control unit being performed by the second intermediate electronic control unit;
a power source relay provided between the first power source path and the second power source path; and
a communication relay provided between the first communication path and the second communication path, wherein
when the upper electronic control unit detects that an anomaly occurs in the first intermediate electronic control unit, the power source relay and the communication relay are controlled such that the first power source path and the second power source path are connected to each other and the first communication path and the second communication path are connected to each other, and the electric power supply to the first lower electronic control unit and the communication management of the first lower electronic control unit are performed by the second intermediate electronic control unit.

2. The in-vehicle network system according to claim 1, wherein when the upper electronic control unit detects that an anomaly occurs in the second intermediate electronic control unit, the power source relay and the communication relay are controlled such that the first power source path and the second power source path are connected to each other and the first communication path and the second communication path are connected to each other, and the electric power supply to the second lower electronic control unit and the communication management of the second lower electronic control unit are performed by the first intermediate electronic control unit.

3. The in-vehicle network system according to claim 1, wherein the upper electronic control unit is configured to, when the second intermediate electronic control unit performs the communication management of the first lower electronic control unit, update information stored in the second intermediate electronic control unit.

4. The in-vehicle network system according to claim 2, wherein
the second intermediate electronic control unit is configured to, when the second intermediate electronic control unit performs the communication management of the first lower electronic control unit, update information to be used for performing the communication management, and
the first intermediate electronic control unit is configured to, when the first intermediate electronic control unit performs the communication management of the second lower electronic control unit, update information to be used for performing the communication management.

5. An in-vehicle network system, comprising:
a power source;
an upper electronic control unit;
a plurality of intermediate electronic control units configured to receive electric power supply from the power source and perform communication with the upper electronic control unit;
a plurality of lower electronic control units that are connected to any one of the intermediate electronic control units via a power source path and a communication path, electric power supply to each of the lower electronic control units and communication management of each of the lower electronic control units are performed by the intermediate electronic control unit to which each of the lower electronic control units is connected;

a power source relay provided between the power source path of each of the intermediate electronic control units and the power source path of each of other two or more of the intermediate electronic control units; and a communication relay provided between the communication path of each of the intermediate electronic control units and the communication path of each of other two or more of the intermediate electronic control units, wherein:

when the upper electronic control unit detects that an anomaly occurs in any one of the intermediate electronic control units, the power source relay and the communication relay are controlled such that connection between the power source paths and connection between the communication paths of the intermediate electronic control unit in which the anomaly occurs and a selected intermediate electronic control unit that is selected from the other two or more intermediate electronic control units are established, and the electric power supply to and the communication management of the lower electronic control unit connected to the intermediate electronic control unit in which the anomaly occurs are performed by the selected intermediate electronic control unit.

6. The in-vehicle network system according to claim 5, wherein the selected intermediate electronic control unit is the intermediate electronic control unit having a smallest communication load of the communication path among the other two or more intermediate electronic control units.

* * * * *